(12) United States Patent
Nakazawa

(10) Patent No.: US 7,945,646 B2
(45) Date of Patent: May 17, 2011

(54) DISTINGUISHABLE DISPLAY OF SEARCHED NETWORK DEVICES WITH A PHYSICAL ADDRESS OR A NETWORK ADDRESS

(75) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/502,785

(22) PCT Filed: Feb. 20, 2003

(86) PCT No.: PCT/JP03/01862
§ 371 (c)(1),
(2), (4) Date: Jul. 29, 2004

(87) PCT Pub. No.: WO03/071742
PCT Pub. Date: Aug. 28, 2003

(65) Prior Publication Data
US 2005/0086332 A1 Apr. 21, 2005

(30) Foreign Application Priority Data

Feb. 22, 2002 (JP) .................... 2002-046435
May 16, 2002 (JP) .................... 2002-141546
Jan. 28, 2003 (JP) .................... 2003-018906

(51) Int. Cl.
*G06F 15/177* (2006.01)
(52) U.S. Cl. ......... 709/220; 709/221; 709/222; 709/223
(58) Field of Classification Search .............. 709/220, 709/223, 224, 226, 221, 222
See application file for complete search history.

(56) References Cited

U.S. PATENT DOCUMENTS

| 5,917,808 | A | * | 6/1999 | Kosbab | ............. | 370/254 |
| 5,923,850 | A | | 7/1999 | Barroux | | |
| 5,991,828 | A | * | 11/1999 | Horie et al. | .............. | 710/8 |
| 6,982,953 | B1 | * | 1/2006 | Swales | .............. | 370/218 |
| 7,136,642 | B1 | * | 11/2006 | Massie et al. | .............. | 455/428 |
| 7,136,914 | B2 | * | 11/2006 | Motoyama | .............. | 709/223 |
| 2001/0049729 | A1 | * | 12/2001 | Carolan et al. | .............. | 709/220 |
| 2002/0159448 | A1 | * | 10/2002 | Ito et al. | .............. | 370/389 |
| 2003/0054821 | A1 | * | 3/2003 | Kita et al. | .............. | 455/435 |

(Continued)

FOREIGN PATENT DOCUMENTS

EP    0 490 624    6/1992

(Continued)

OTHER PUBLICATIONS

European Search Report dated Feb. 26, 2010 issued during prosecution of related European application No. 03705353.5.

Primary Examiner — Jeffrey Pwu
Assistant Examiner — Abdelnabi O Musa
(74) Attorney, Agent, or Firm — Fitzpatrick, Cella, Harper & Scinto

(57) ABSTRACT

In a network device management method, a first packet to search for network devices is generated and broadcasted on the network. In addition, a second packet to search for network devices is generated and broadcasted on the network. A comparison is made between a network device that replies to the first packet and a network device that replies to the second packet, and it is determined based on the comparison whether predetermined information has been set for the network device, and the determination results are displayed.

8 Claims, 15 Drawing Sheets

U.S. PATENT DOCUMENTS

| | | | |
|---|---|---|---|
| 2005/0038880 A1* | 2/2005 | Danforth | 709/222 |
| 2005/0086332 A1* | 4/2005 | Nakazawa | 709/223 |
| 2006/0230130 A1* | 10/2006 | Cho et al. | 709/223 |
| 2006/0251013 A1* | 11/2006 | Roy et al. | 370/329 |

FOREIGN PATENT DOCUMENTS

| | | |
|---|---|---|
| EP | 1 052 806 | 11/2000 |
| JP | 11-249989 | 9/1999 |
| JP | 2001-223721 | 8/2001 |

* cited by examiner

FIG. 3

| Version (2 bytes) | | |
|---|---|---|
| Command (2 bytes) | | |
| Result code (2 bytes) | | |
| Protocol information | NetWare valid (1 byte) | |
| | IP valid (1 byte) | |
| | Reverved (n bytes) | |
| IPX frame types (2 bytes) | | |
| IP information | IP frame types (2 bytes) | |
| | IP settings (2 bytes) | |
| | IP address (4 bytes) | |
| | Gateway address (4 bytes) | |
| | Subnet mask (4 bytes) | |
| | Broadcast address (4 bytes) | |
| MAC address (6 bytes) | | |

FIG. 6

NETWORK DEVICE LIST

| IP ADDRESS | DEVICE NAME | STATUS | PRODUCT NAME |
|---|---|---|---|
| 601 — NOT SET | 00:00:85:11:22:33 | | |
| 602 — NOT SET | 00:00:85:12:34:56 | | |
| 603 — 192.168.0.10 | FIRST SALES SECTION LBP | READY | LB-1234 |
| 604 — 192.168.0.14 | FIRST SALES SECTION COLOR | ERROR | Color LB-2800 |
| 605 — 192.168.0.21 | SECOND SALES SECTION LBP | READY | LB-1233 |
| 606 — 192.168.0.24 | SECOND SALES SECTION A3 MONOCHROMIC | WARNING | LB-3454 |
| 607 — 192.168.0.55 | ACCOUNTING MFP | READY | 5050x |
| 608 — 192.168.0.245 | ACCOUNTING HIGH-SPEED MONOCHROMIC | WARNING | LB-8552 |

FIG. 12

NEWLY INSTALLED NETWORK DEVICE LIST

| IP ADDRESS | MAC ADDRESS | PRODUCT NAME |
|---|---|---|
| 192.168.0.10 | 00:00:85:11:22:33 | LB-1234 |
| 192.168.0.11 | 00:00:85:12:34:56 | Color LB-2800 |
| 192.168.0.12 | 00:00:85:43:6a:cc | LB-1233 |
| 192.168.0.13 | 00:00:85:a3:23:99 | LB-3454 |
| 192.168.0.14 | 00:00:85:01:22:fe | 5050x |

SET DETAILS...    END

DISTINGUISHABLE DISPLAY OF SEARCHED NETWORK DEVICES WITH A PHYSICAL ADDRESS OR A NETWORK ADDRESS

TECHNICAL FIELD

The present invention relates to a network device control apparatus and a management method which enable control of a network device connected to a network.

BACKGROUND ART

Each of network devices connected to local area networks is identified by a network device address (hereafter "network address") specific to a protocol for the corresponding network to be operated and managed. Identification of individual devices on the networks is made by using the network addresses for the devices to enable the devices to be controlled by a host computer and to exchange data with other network devices on the network.

In a process using the internet protocol (IP), e.g., management of network devices on a network or printing with a printer connected to a network, preliminary assignment of IP addresses effective in the network to the network devices is required.

However, in many of the cases where a network device is connected to a network for the first time (in an initially installed state or the like) or where a network device moved from one network is installed on another network, a network address assigned to a network device before the network device is moved is an invalid address in a network on which the network device is newly installed, because the network segments are changed. In such a case, it is necessary for a user to set a suitable network address for a network device by using a network management software or the like.

In a case where an effective network address is assigned via a network such as a local area network (LAN) from network management software to a network device assigned no effective network address, some network protocol is required for performing communication for assignment. However, the network device assigned no effective network address cannot use any network protocol since the standard network address, e.g., an IP address is not set for it, and cannot use a standard network protocol such as the Simple Network Management Protocol (SNMP).

To solve this problem, network device control methods described below have been proposed.
(1) A network device control method has been proposed in which network management software broadcasts a search packet though a network, and each of a plurality of network devices connected to the network then transmits a reply packet. The network management software receives the reply packet from each network device and displays a list of network addresses (e.g., IP addresses) or physical addresses (e.g., Media Access Control (MAC) addresses), etc., of the network devices found by searching. When a user selects one of the network devices from the list, the network management software sets an input value (e.g., a network address) with respect to the selected network device.
(2) A method of automatically setting a suitable network address for a network device has also been proposed in which a network device in a network periodically broadcasts a request for an address, automatic address assignment software executed on a host connected to the network sends back, in response to this request, a reply packet including a suitable network address to the network device, and the network device receives the reply packet and assigns the network address in the reply packet to itself.

In the conventional method (1), however, since a search packet is transmitted to search for network devices, all the network devices replying to the search packet are listed. Therefore, the method has a drawback in that it is difficult for a user to discriminate a network device assigned no network address, i.e., a device to which a network address should be assigned from a plurality of network devices connected to a network.

The conventional method (2) includes the procedure in which a network device itself periodically broadcasts an address request packet and therefore has problems described below. First, the network traffic increases if the number of network devices assigned no network address is increased. Second, it is necessary that automatic network address assignment software be operating on the same network to reply to the address request packet send back a suitable network address as a reply. Third, the method lacks a means for confirming the completion of automatic assignment of a network address. Fourth, it is difficult to reuse an assigned network address after the assigned address has become unnecessary.

DISCLOSURE OF THE INVENTION

In view of the above-described problems of the conventional art, an object of the present invention is to enable display of one or more network devices for which predetermined information has been set and one or more network devices for which no such information has been set, especially one or more network devices to which a network address has been assigned and one or more network devices to which no network address has been assigned, distinguishably from each other. If a certain network device without any network address is specified manually by a user or automatically, a network address is newly set for the network device.

Another object of the present invention is to ensure reduced network traffic in the case of automatic assignment of network addresses and to enable user's visual recognition of a network device automatically assigned a network address.

Still another object of the present invention is to enable reuse of an assigned network address after the assigned address has become unnecessary.

BRIEF DESCRIPTION OF THE DRAWINGS

FIG. 3 is a diagram showing the structure of the data portion of the packet in the configurator protocol shown in FIG. 2;

FIG. 6 is a diagram showing an example of a device list display window displayed by a device list display UI module 409;

FIG. 12 is a diagram showing an example of a user interface for displaying a list of network devices to which network addresses are assigned;

DESCRIPTION OF THE PREFERRED EMBODIMENTS

Figure 1:
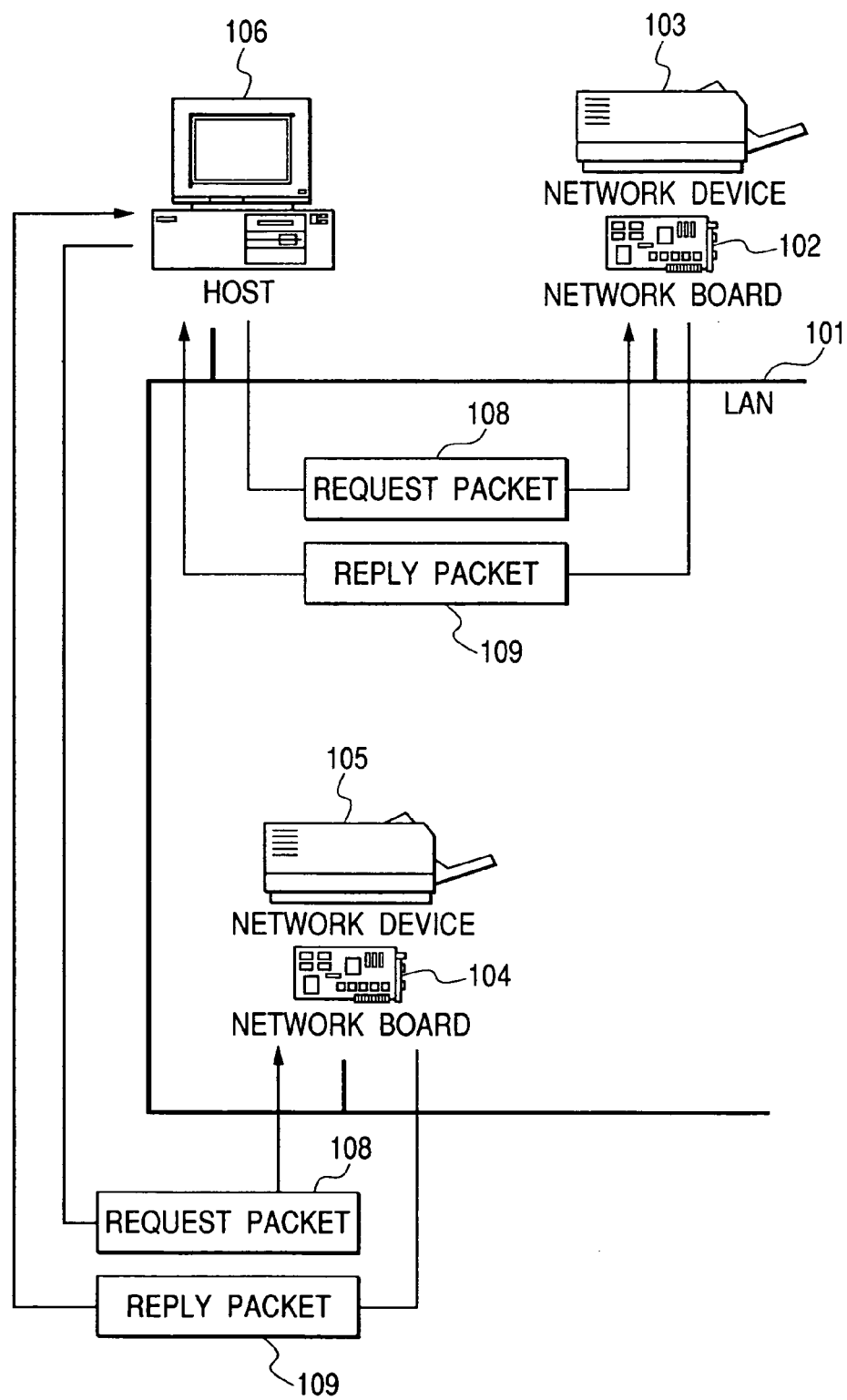
FIG. 1 is a diagram showing the configuration of a network device best representing features of an embodiment of the present invention.

FIG. 1 is a diagram showing the configuration of a network device as a representation of features of an embodiment of the present invention. In FIG. 1, a local area network (LAN) indicated by 101 and network boards are indicated by 102 and 104. The network boards 102 and 104 are attached to network devices 103 and 105 and are connected to the LAN 101 as an interface between the devices and the network.

A host computer (hereinafter referred to as "host") 106 is connected to the LAN 101. The host 106, on which a network device control program runs, transmits a request packet 108 to the LAN 101. The network boards 102 and 104 connected in an active state receive the request packet and sends back reply packets 109 in response to the request packet. It is assumed here that the network board 102 is assigned a network address (e.g., an IP address) effective on a standard network protocol (e.g., the IP protocol) effective on the LAN 101, while the network board 104 is assigned no effective network address.

Figure 9:
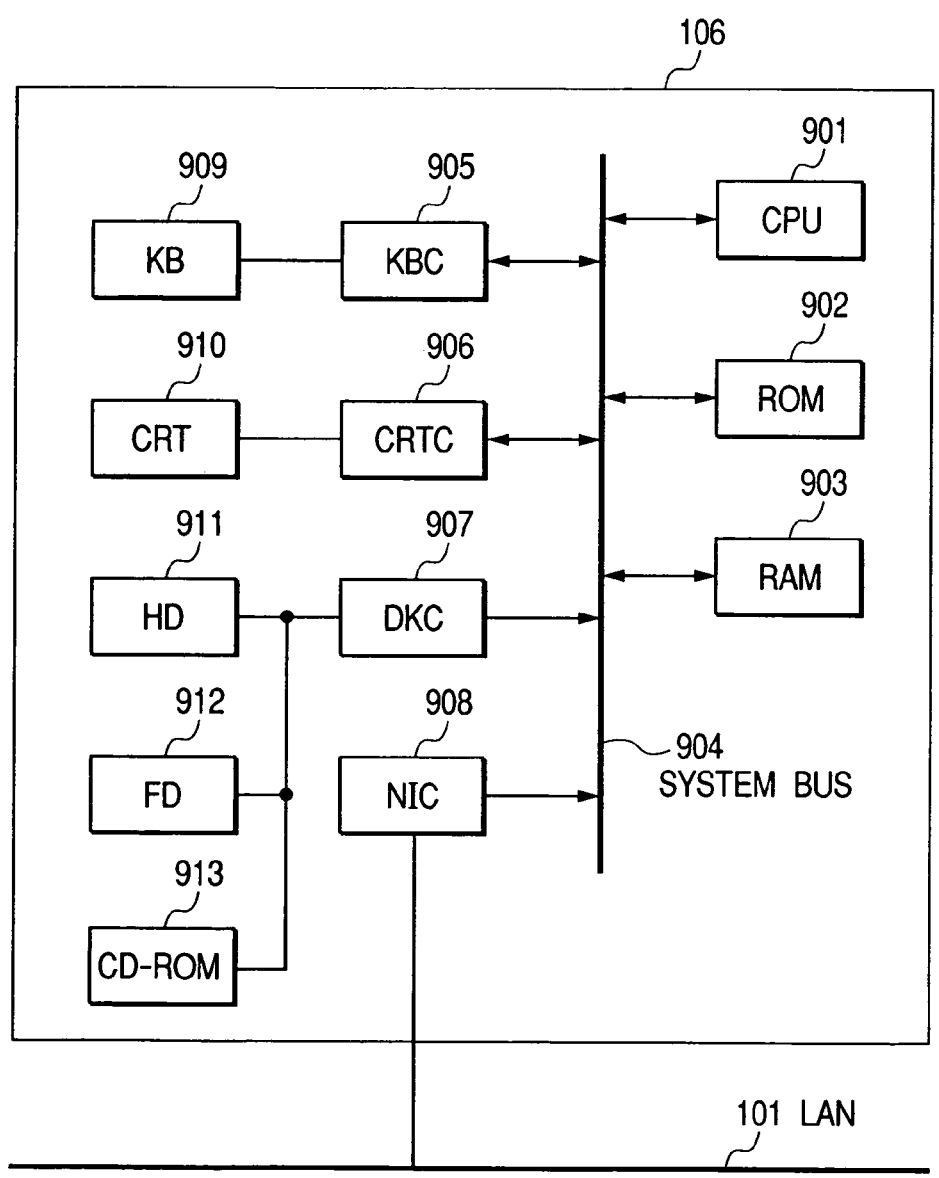
FIG. 9 is a block diagram showing the configuration of a host computer on which network management software can operate.

FIG. 9 is a block diagram showing the configuration of the host 106 on which a piece of network management software can operate.

Referring to FIG. 9, the host 106 has a central processing unit (CPU) 901 which executes a piece of network management software stored in a read-only memory (ROM) 902 or a hard disk (HD) 911 or supplied from a storage medium such as a compact disc-read only memory (CD-ROM) 913, and performs overall control on devices connected to a system bus 904.

A random-access memory 903 functions as a work area or the like for the CPU 901. A keyboard controller (KBC) 905 controls processing according to instructions input from a keyboard (KB) 909 or a pointing device (not shown). A CRT controller (CRTC) 906 controls a cathode-ray tube (CRT) display 910. A disk controller (DKC) 907 controls operations for accessing a hard disk (HD) 911 on which various application programs, user programs, edited files, a data base, etc., are stored, a flexible disk controller (FD) 912, and a CD-ROM drive 913. A network interface card (NIC) 908 exchanges data with network devices through the LAN 101. The most essential among pieces of hardware for executing the network management software, whose modular configuration will be described in detail, is the CPU 901.

<Configurator Protocol>

Figure 2:
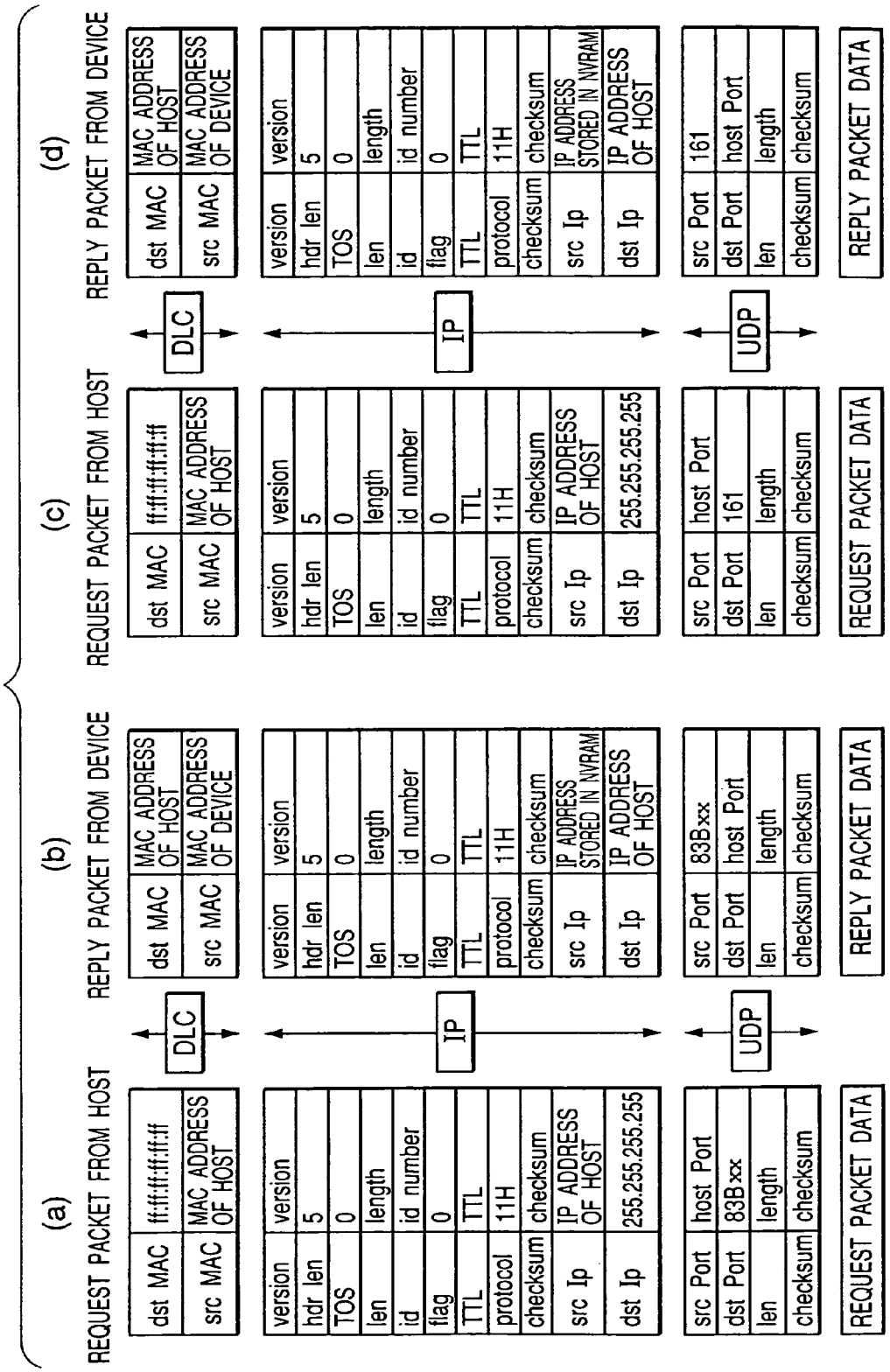
FIG. 2 is a diagram showing examples of packet headers in a case where a configurator packet used for search of network devices and various settings in the network devices are implemented on TCP/IP.

FIG. 2 is a diagram showing examples of a configurator packet and a Simple Network Management Protocol (SNMP) packet. Sections (a) and (b) show examples of packet headers in a case where a configurator packet used in search of network devices is implemented on the Transmission Control Protocol/Internet Protocol (TCP/IP). Sections (c) and (d) show examples of headers of an SNMP packet used in search for a network device. Each of these packets is formed of a User Datagram Protocol (UDP) header, an Internet Protocol (IP) header, and a Data Link Control (DLC) header.

UDP denotes a transport layer protocol in TCP/IP, and IP denotes a network layer protocol used in the Internet. Each of these protocols is a connectionless protocol. DLC denotes a data management layer protocol for operation and management of network devices on the network.

FIG. 2 shows in (a) an example of a request packet in accordance with a configurator protocol, which is broadcast from the host 106. FIG. 2 shows in (b) an example of a reply packet in reply to the request packet shown in (a) of FIG. 2. Protocols used for searching and setting for network devices in the embodiment will be referred to as "configurator protocol", and a packet based on a configurator protocol will be referred to as "configurator packet". A configurator protocol is implemented as a UDP and is capable of increasing the throughput and of improving reliability of the network by multiplexing connections.

In a case where a request from the host 106 is a broadcast of a network device search request, a destination physical address (dst MAC) set in DLC is "ff:ff:ff:ff:ff:ff". Active devices connected to the network can receive this frame. For example, "ff:ff:ff:ff:ff:ff" is a broadcast address indicating all destinations. As an example of a physical address, a Media Access Control (MAC) address can be mentioned.

The destination port number (dst Port) of the configurator packet is "83Bxx". Each of the network devices determines whether the transmitted packet is a configurator packet by confirming whether the destination port number is "83Bxx". If the transmitted packet is a configurator packet, the device transmits a reply packet regardless of whether or not a network address is set. When the power is on, each of the network boards 102 and 104 is connected in an active state to the LAN 101, i.e., constantly in a state of being able to receive the configurator packet.

FIG. 2 shows in (c) an example of an SNMP request packet broadcast from the host 106. FIG. 2 shows in (d) an example of a reply packet in reply to the request packet shown in (c) of FIG. 2.

In a case where a request from the host 106 is a broadcast of a network device search request, a destination physical address (dst MAC) set in DLC is "ff:ff:ff:ff:ff:ff". Active devices connected to the network can receive this frame.

The destination port number (dst Port) of the SNMP packet is "161". Each of the network devices determines whether the transmitted packet is an SNMP packet by confirming whether the destination port number is "161". In the case where the transmitted packet is an SNMP packet, the device transmits no reply packet if no network address is set.

In the case of some other request to one of the devices (a request other than the search request, e.g., setting request), e.g., a request packet to the network board 102 shown in FIG. 1, the physical address of the network board 102 is set as a destination physical address (dst MAC) in DLC. The network board 102 is thereby enabled to receive the packet frame transmitted from the host 106. It is possible to set information even for a network device for which no network address has been set, by using the destination physical address, in the case of a setting request packet in the configurator packet.

In the network device search request, a transmission destination IP address (dst IP) set in IP is "255.255.255.255". In the case of other requests, any IP address (the IP address of a transmission destination network device) effective in LAN 101, different from the IP address assigned to the host 106, can be set. The transmission destination network device is thereby enabled to receive the packet frame from the host 106.

<Details of Configurator Packet Data>

FIG. 3 shows details of the structure of the data portion of the packet in the configurator protocol shown in FIG. 2. Individual items of data in the structure are as described below in detail.

Version (2 bytes): a version number
Command Code (2 bytes): a code indicating a function requested by this packet
   0: Set (setting)
   1: Get (reference)
   4: Discovery (search)
Result Code (2 bytes): a code indicating a request result
   0x0000: success
   0x001: no designated protocol stack
   0x0002: version abnormality
   0x0100: protocol setting abnormality (not ascertained in detail)
   0x0101: protocol setting abnormality (NetWare IPX)
   0x0102: protocol setting abnormality (TCP/IP)
Protocol Information: a flag corresponding to each protocol information item.

In a case where the Request Code is 0 (setting), only protocol information having 1 as a corresponding byte is set. In a case where the Request Code is 1 (reference) or 4 (search), a setting is made if the network board has the corresponding protocol stack installed therein.

NetWare frame types: a frame type used in IPX protocol. If a plurality of frame types can be set, the result of OR operation of the type values is used.
FrameType (2 bytes): a frame type used in NetWare
In the case of Ethernet:
   0: Disable (NetWare disable)
   1: 802.3
   2: 802.2
   4: Ethernet II
   16: Auto Sense (automatic detection)
IP Info: a field for setting of information relating to TCP/IP, and reference and ability challenge to TCP/IP
IP FrameType (2 bytes): a frame type used in TCP/IP
   0: Disable (TCP/IP disable)
   4: Ethernet II.
IP Mode (2 bytes): a method of obtaining an IP environment. In a case where a plurality of IP Modes can be designated, the result of OR operation of the mode values is used.
   0: IP fixed (rising from an NVRAM value)
   1: BOOTP valid
   2: RARP valid
   4: DHCP valid.
IP address (4 bytes): an IP address of a network board
Gateway address (4 bytes): a Gateway address of a network board
Subnetmask (4 bytes): a subnet mask of a network board
MAC address (6 bytes): a MAC address of a board. If the RequestCode is other than 4(Discovery (search)), and if the value of the MAC adress field and the MAC address of a network board do not coincide with each other, the packet is ignored.

<Description of Network Management Program>

A network management program executed on the host 106 will next be described. A standardized data base called Management Information Base (MIB) is constructed in the network interface portions (network boards 102 and 104) of the network devices 103 and 105 connected to the LAN 101. This portion communicates with the host 106 on the network via the network management protocol called Simple Network Management Protocol (SNMP), thus enabling communication between the host and the network device.

On the other hand, a software program called a network management program is executed on the host 106 to enable exchange of necessary information via the network by means of the MIB (Management Information Base) and by using the above-mentioned SNMP.

Figure 4:
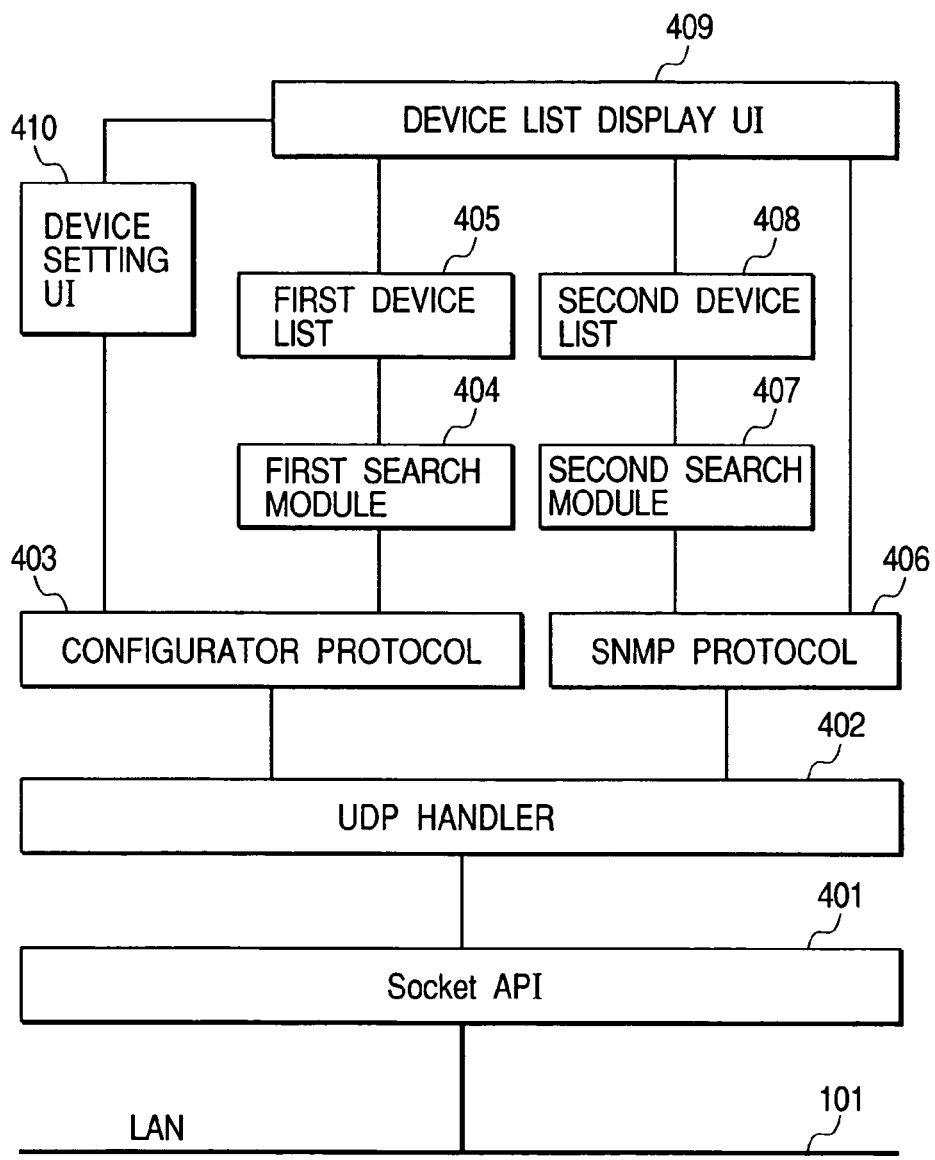
FIG. 4 is a diagram showing the modular configuration of a network management program.

FIG. 4 is a diagram showing the modular configuration of the network management program. Referring to FIG. 4, a network application program interface (API) provided by the operating system which executes the network management program. In this embodiment, Socket API used in Unix (trademark) and Microsoft Windows (trademark) is used.

A UDP handler 402 is provided to perform transmission and reception of UDP packets on the upper TCP/IP protocol. The UDP handler 402 is called up by a module for handling an upper configurator protocol 403 or SNMP protocol 406 to perform processing for transmitting and receiving packets in accordance with the protocol.

A first search module 404 searches network devices by using the configurator protocol 403. Devices found by searching on the basis of processing performed by this module are stored as first device list information (405) by a storage means. A second search module 407 searches network devices by using the SNMP protocol. Devices found by searching on the basis of processing performed by this module are stored as second device list information (408) by the storage means.

A user interface (UI) module 409 displays network devices found by searching using the configurator protocol 403 and searching using the SNMP protocol 406 on the basis of a first device list 405 and a second device list 408, i.e., lists of devices found by searching using the configurator protocol 403 and searching using the SNMP protocol 406. The UI module 409 displays, in a list, devices having no set network addresses in such a form that a user can discriminate these devices from the others. The UI module 409 selects from the displayed list one of the network devices for which a network address should be set.

Figure 7:
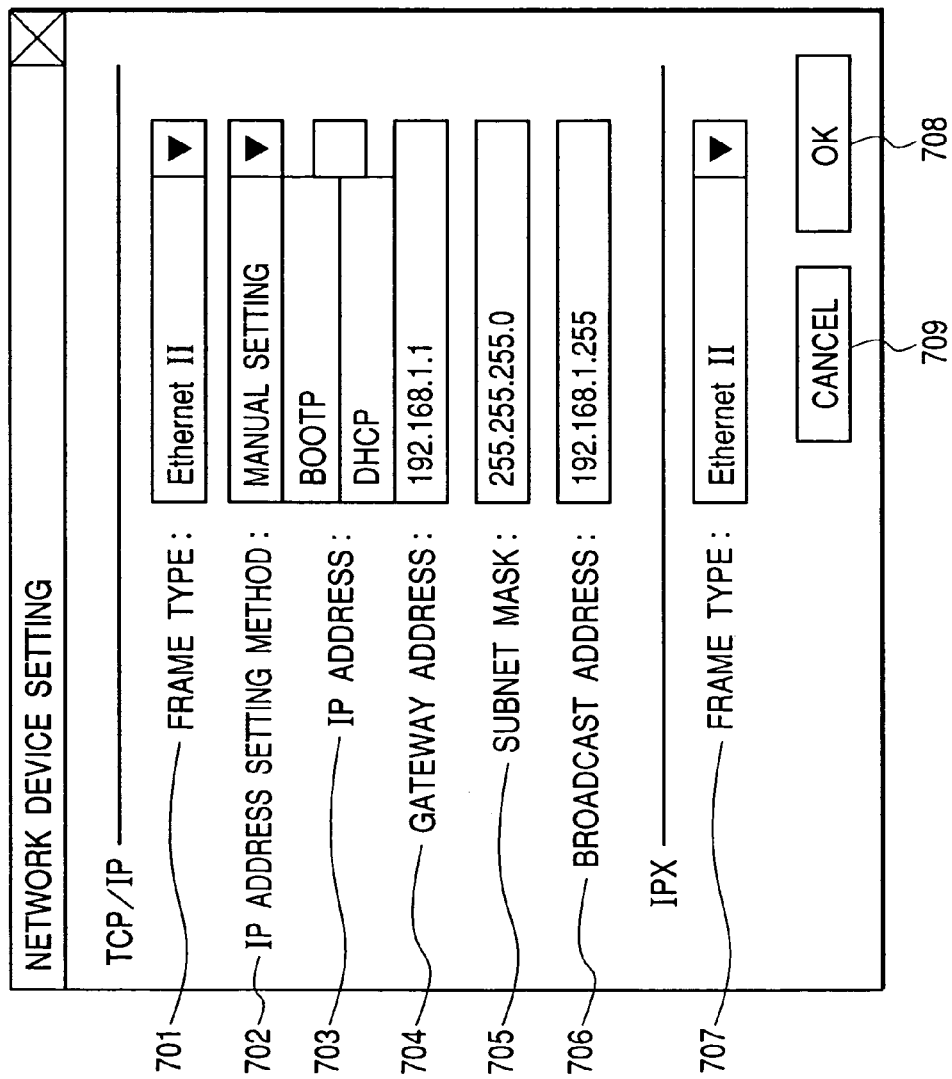
FIG. 7 is a diagram showing an example of an interface window displayed by a device setting UI module 410 to enable particular network setting with respect to a network device designated in the list shown in FIG. 6.

A device setting UI module 410 sets information including a network address for a network device selected by the device list display UI module 409. FIGS. 6 and 7 show examples of a device list and a network device setting window respectively displayed by the device list display UI module 409 and the device setting UI module 410.

FIG. 6 is a diagram showing an example of a device list display window displayed by the device list display UI module 409. When a device search request is broadcast from the host 106 to the LAN 101, a network device replying only to the search request packet based on the configurator protocol 403 and a network device replying to the search request packet based on the Standard Network Management Protocol (SNMP) are displayed in such a form as to be discriminable from each other by a user.

In this example of display, IP addresses are used as a network address in the standard network protocol, and the IP addresses are displayed if they are effective addresses. In the example of display, two network devices (601, 602) for which no IP addresses have been set, while six network devices (603 to 608) for which effective network addresses are set are displayed. To enable discrimination of devices having no IP address set for them, a MAC address of the network board is displayed. The MAC address is based on the physical address with which the network device replies to the (broadcast) destination physical address in DLC in request packet data shown in (a) of FIG. 2 by sending a reply packet (shown in (b) of FIG. 2).

For discrimination between network devices having set network addresses and network devices having no set network addresses, icons different from each other may be used.

FIG. 7 is a diagram showing an example of an interface window displayed by the device setting UI module 410 to enable particular network setting with respect to a network device designated in the list shown in FIG. 6. Through this window, a frame type in the predetermined protocol (TCP/IP or the like), an IP address setting method, etc., can be set. In this window, when an "OK" button (708) is clicked after making settings with respect to 701 to 707, the network setting program generates an information setting packet (setting request packet) and transmits this packet to the designated network device (509 in FIG. 5), thus performing information setting via the network.

The procedure of setting information with respect to network devices will be described with reference to the flowchart of FIG. 8. Processing shown in the flowchart is controlled by the network management program.

Figure 8:
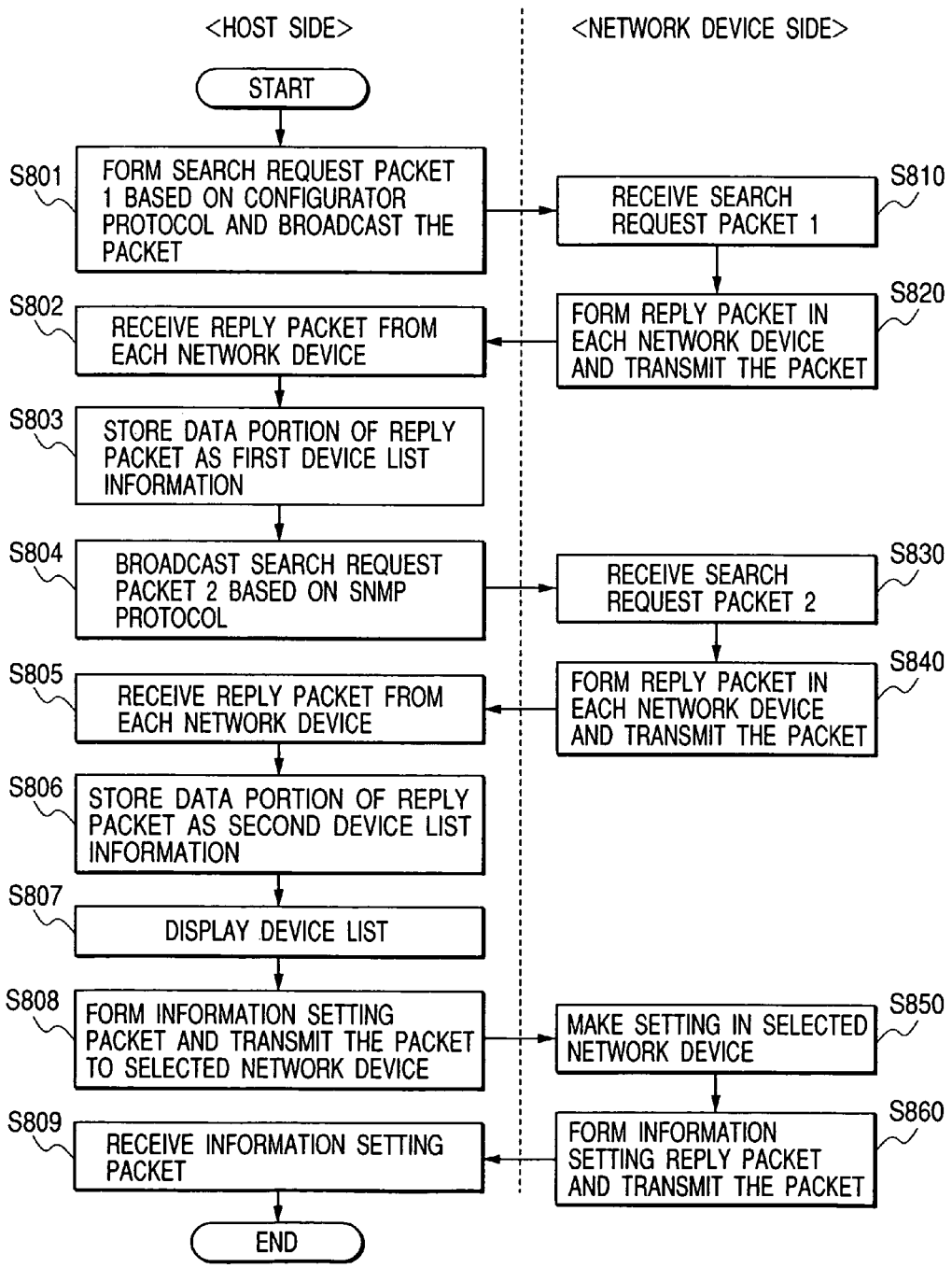
FIG. 8 is a flowchart showing the procedure of setting information with respect to a network device.

In step S801 shown in FIG. 8, to search network devices, the first search module (404) forms a search request packet 1 based on the configurator protocol and broadcasts the packet 1 to the network devices. Since this search request packet 1 is a broadcast packet having a destination physical address (dst MAC)="ff:ff:ff:ff:ff:ff" and a destination packet number (dst Port)="83Bxx" as described above, each of the active devices connected to the network can receive this frame.

Each network device receiving the search request packet 1 forms and transmits a reply packet (S810, S820).

In step S802, Socket API 401 receives the reply packet transmitted from each network device. At that time, the data portion of each received reply packet is stored as first device list information by the storage means (S803).

In step S804, to search the network devices, the second search module forms a search request packet 2 based on the SNMP protocol and broadcasts the packet 2. Since this search request packet 2 is a broadcast packet having a transmission destination IP address=255.255.255.255, and a destination port number (dst Port)="161" as described above, it reaches each of the network devices connected to the same subnet.

Each network device forms and transmits a reply packet (S830, S840) in response to this search request packet 2. Network devices having no IP address set for them do not transmit a reply packet because they cannot receive the search request packet 2 or discards the search request packet 2 even if they can receive the search request packet 2.

In Step S805, the reply packet transmitted from each network device is received and at that time the data portion of each received reply packet is stored as a second device list information by the storage means (S806).

In step S807, the network device list display UI module 409 calls the first and second groups of device list information stored by processing in step S803 and processing in step S806 and displays the contents thereof as a list. This list is displayed in such a state that the devices having set IP address and the devices having no set IP addresses are discriminable from each other.

In step S808, predetermined network information (FIG. 7) is set with respect to one of the network devices selected by the input means (not shown) from the network devices in the list displayed in step S807. The device setting UI module 410 forms an information setting packet on the basis of the contents of the information set in this step and transmits it to the selected network device by setting the physical address as a destination.

In step S850, the selected network device receives the information setting packet and sets the contents set in the data portion of the packet as information about itself. After this setting, the network device forms an information setting reply packet and transmits this packet to the host 106 (S860).

The host 106 receives the information setting reply packet from the selected network device and ends the process (S809).

By the above-described procedure, network information is set in the network device to enable communication to the device and control of the device on the network.

Figure 5:
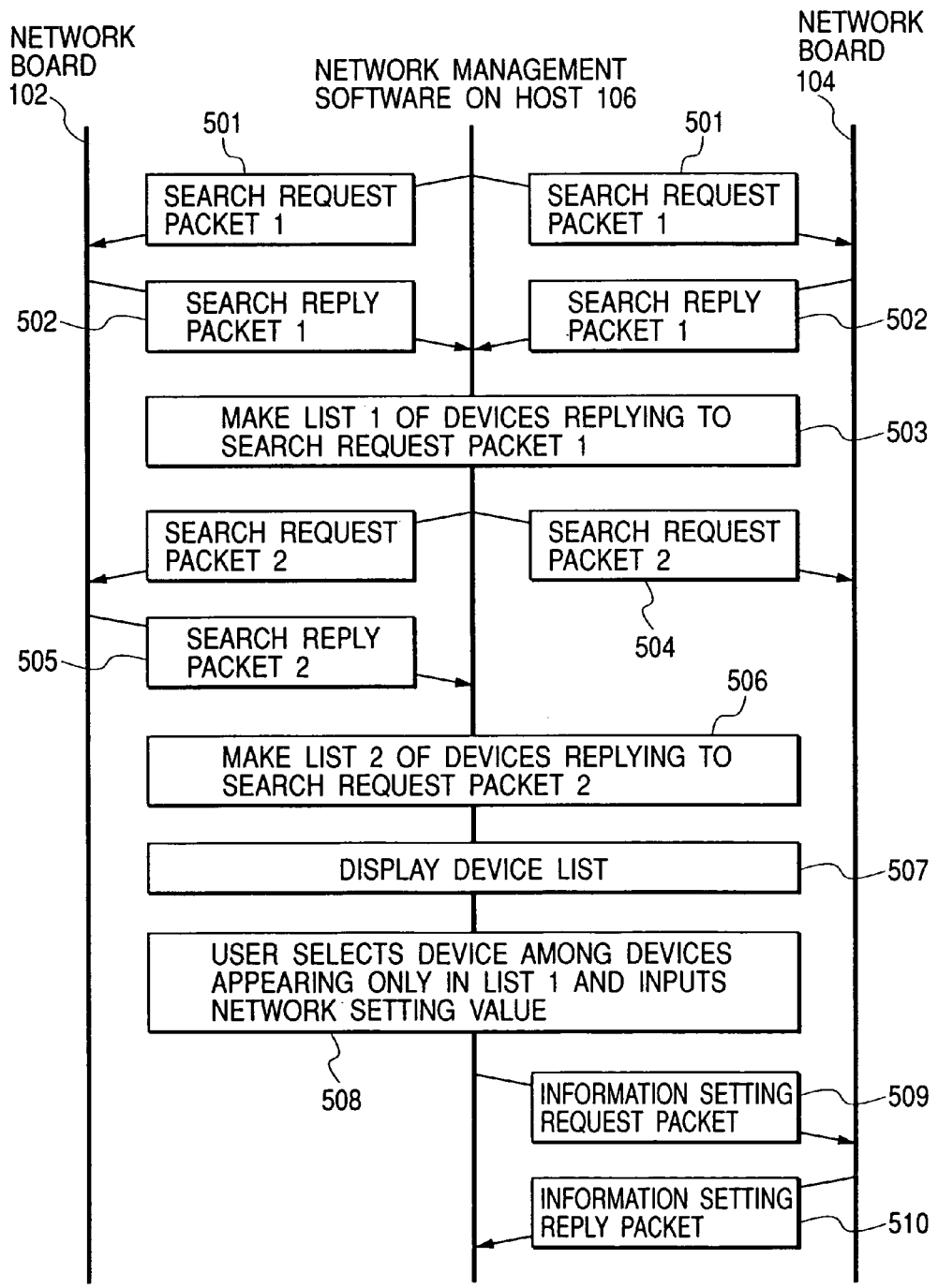
FIG. 5 is a sequential diagram showing flows of transmitted and received packets and processing when settings are made in network boards 102 and 104 by the network management software on the host 106 communicating with the network boards 102 and 104.

FIG. 5 is a sequential diagram showing flows of transmitted and received packets and processing when settings are made in the network boards 102 and 104 by the network management software on the host 106 communicating with the network boards 102 and 104.

The network management software first broadcasts a search request packet 1 based on the configurator protocol to the LAN 101 (501).

The network boards 102 and 104 connected to the LAN 101 receive the search request packet 1 based on the configurator protocol and transmit information on their current settings as a reply packet (502).

The network management software makes a first device list with respect to the network devices replying to the search request packet 501 on the basis of the contents of the search request reply packets sent back from the network boards 102 and 104, and stores the list by the storage means (not shown) (503).

Subsequently, the network management software on the host 106 broadcasts a network device search request packet 2 based on the standard protocol to the LAN 101 (504). The standard protocol used in this case is, for example, the Simple Network Management Protocol (SNMP), and the search packet is an operation request in accordance with "GET" or "GET-NEXT" in SNMP relating to collection of management information, sent from the host (manager) 106 to the devices to be managed (agents). The network board 102 having a network address effective on the LAN 101 with respect to the standard protocol receives the search request packet 2 and sends back a search reply packet 2 to it (505). On the other hand, the network board 104 not yet assigned a network address effective with respect to the standard protocol cannot send back a reply packet in response to the search request packet 2. The network management software makes a second device list with respect to the network devices replying to the search request packet 2 (504) and stores the list by the storage means (not shown) (506).

The network management software can identify the network devices capable of replying to the search request packet 2 among the network devices connected to the LAN 101 on the basis of the device list based on the search reply packet 1 and the device list 2 based on the search reply packet 2. As a result, the network management software displays in a list the network devices each assigned a network address effective on the LAN 101 with respect to the standard protocol, e.g., the network board 102, and the network devices each assigned no effective network address, e.g., the network board 104 (called an unset network device) in such a form that the devices in the two conditions can be discriminated from each other by user (507).

A user selects one of the network devices not yet assigned a set network address effective with respect to the standard protocol, e.g., the network board 104, and inputs a set value relating to the network, e.g., a network address to be assigned to the network device not yet assigned a set network address (508). An information setting packet is then formed on the basis of the input set value of the network address and is transmitted to the network board 104 (509).

The network board 104 receives the information setting packet and makes a network board network setting on the basis of the content of the received packet (step S850 of FIG. 8) and sends back an information setting reply packet to the network management program (510). The network management program on the host 106 receives the information setting reply packet 510 from the network board 104 and ends the process (S809 of FIG. 8).

As described above, in the apparatus and method for controlling network devices according to this embodiment, a difference in search results is obtained on the basis of a list of network devices found by searching network devices connected on a network using the specific configurator protocol and a list of network devices found by searching using the standard network protocol and having effective network addresses to enable the network devices having no network addresses effective on the standard network protocol to be displayed in a state of being discriminable from the network devices having effective network addresses.

On the basis of this discriminative display, the network devices having no effective network addresses set for them are identified and information setting packets for individual settings are formed and distributed to the network devices, thus enabling network information setting. Network information is set in the network devices to enable the network devices to perform communication and to be controlled on the network.

An embodiment of the present invention in which a network address is automatically assigned to a network device will next be described.

In the following description, the unit indicated by 106 in FIG. 1 is an automatic address assignment apparatus (hereinafter referred to simply as "address assignment apparatus"). An automatic network address assignment program is executed on the address assignment apparatus 106 to perform communication with the network boards 102 and 104 through the LAN 101.

Figure 10:
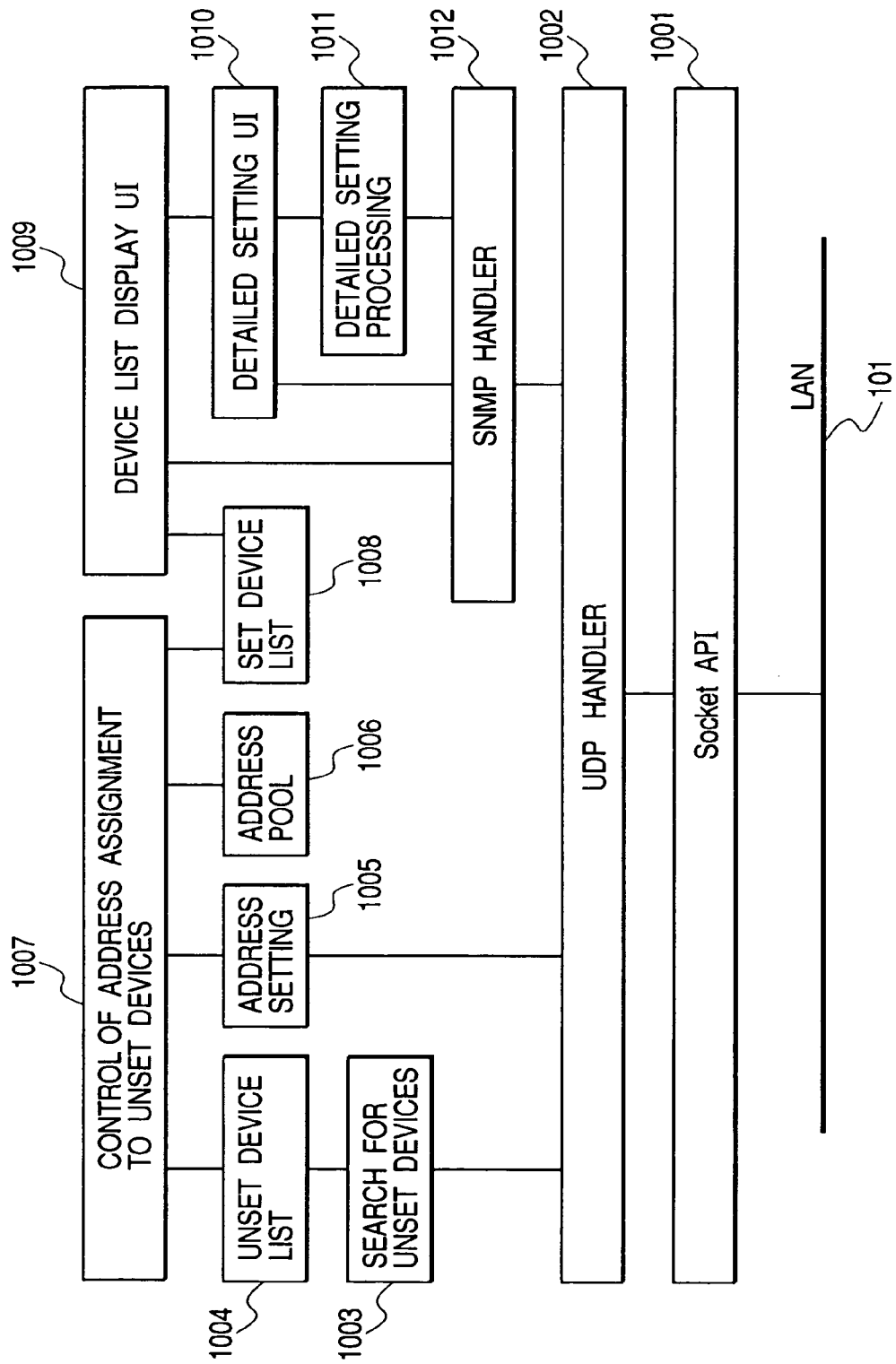
FIG. 10 is a block diagram showing the modular configuration of an automatic network address assignment program.

FIG. 10 is a block diagram showing the modular configuration of the automatic network address assignment program executed on the address assignment apparatus 106.

Referring to FIG. 10, a module 1001 is a network application program interface (API) provided by the operating system which executes the automatic network address assignment program. In the illustrated example, Socket API used in Unix (trademark) and Microsoft Windows (trademark) is used.

A module 1002 is a handler for enabling upper modules to transmit and receive User Datagram Protocol (UDP) packets.

A module 1003 is a module for searching for a network device connected to the LAN 101 and having no set network address on the standard protocol. A list of network address unset network devices found by searching is stored as an unset device list 1004.

A module 1005 is a module for performing processing for assigning a network address to an unset network device.

A module 1006 is an address pool for managing a list of network addresses assignable to unset network devices.

A module 1007 is module for overall control on searching for unset network devices and assigning network addresses from the address pool to the unset network devices.

A module 1008 is a module for managing in a list assigned network addresses and information specific to the network devices.

A module 1009 is a user interface for displaying the set device list managed by the management module 1008 and for making a selection from the list. In this embodiment, information about network devices are collected by using the Simple Network Management Protocol (SNMP) as required to be displayed in the list. With respect to a selected one of the network devices, a detailed setting user interface (UI) 1010 is opened and a user inputs detailed information about the selected network device.

A module 1011 is a module for performing processing for setting in the network device the setting information input by the detailed setting UI 1010. In the illustrated example, detailed settings are realized by using the standard network protocol SNMP. The SNMP handler 1012 is called up to perform setting in the network device.

Figure 11:
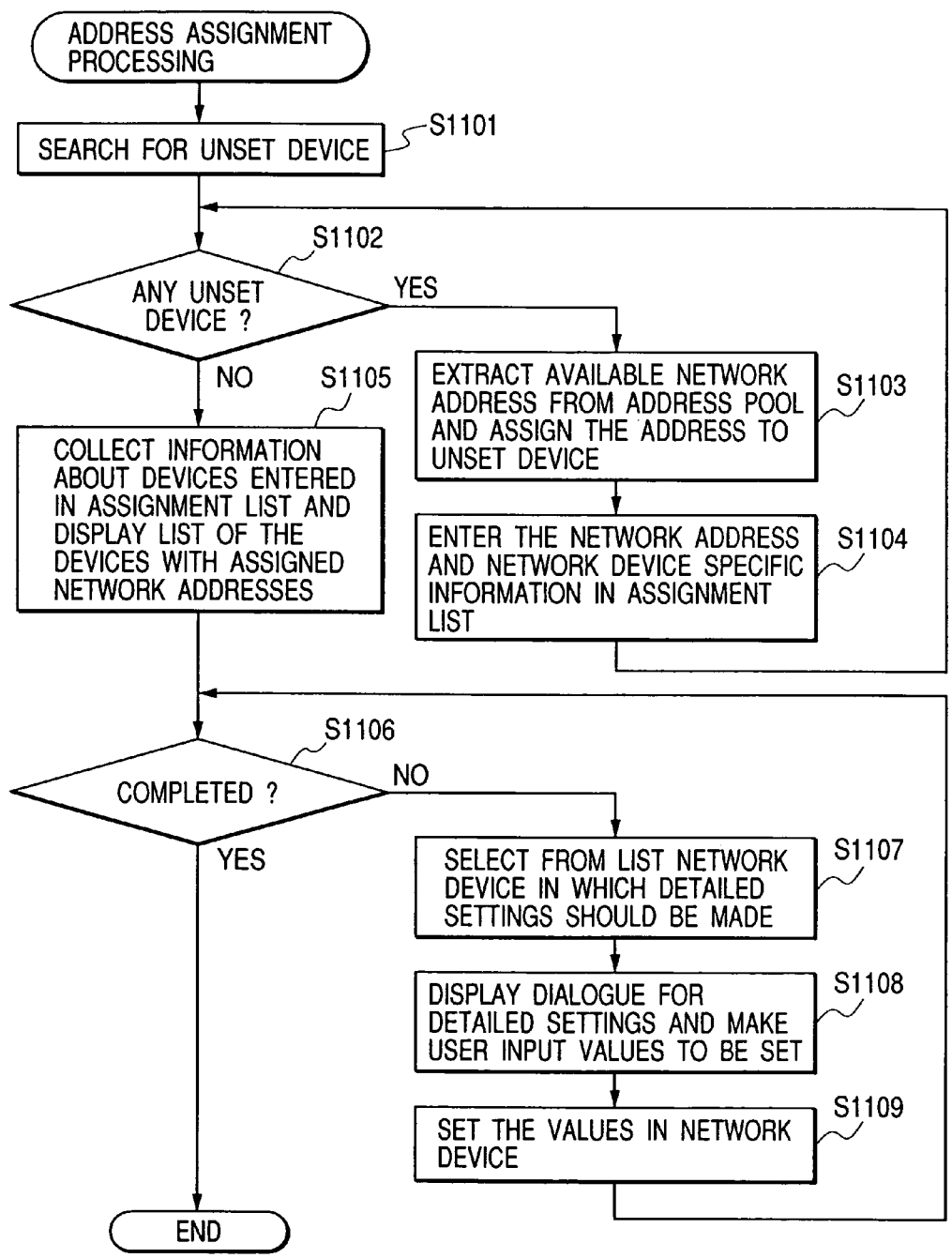
FIG. 11 is a flowchart showing the procedure of the whole of the automatic address assignment program.

FIG. 11 is a flowchart showing the procedure of the whole of the above-described automatic address assignment program.

Referring to FIG. 11, network devices connected to the LAN 101 and each having no set network address on the standard protocol are searched for (step S1101). To search for network address unset network devices, the automatic address assignment program executes steps S801 to S806, identifies network devices listed in first device list information but not listed in second device list information, and regards the identified network devices as a network address unset network device.

If the automatic address assignment program is executed according to an automatic assignment instruction from a user after the completion of the process shown in FIG. 5 or FIG. 8, a search may be performed for network address unset network devices on the basis of first device list information stored in step S804 and second device list information stored in step S806. In such a case, a button or a menu item for reading out the automatic address assignment program is prepared in the network management program.

If a network address unset network device is found by processing in step S1101, a network address is extracted from the pool of network addresses assignable to network devices to be assigned to the found network address unset network device (step S1102 to step S1103).

Thereafter, the network address assigned in step S1103 and information specific to the network device, e.g., a Media Access Control (MAC) address are entered in the assignment list (step S1104).

Processing in steps S1103 and S1104 is performed with respect to all the unset network devices found in step S1101.

After the completion of assignment of network addresses to all the unset network devices, a list of the network devices to which the network addresses have been assigned is displayed (step S1102 to step S1105). At that time, information about the individual network devices may be collected by using the standard protocol, e.g., SNMP as required to be displayed in the list.

If it is determined that the user does not further make a detailed setting with respect to the network devices, the program ends (step S1106 to END).

In a case where the user further makes a setting, the user selects from the list one of the network devices in which detailed settings should be made (step S1107), inputs set values by using the detailed setting dialogue (step S1108) (step S1108), and sets the input information in the network device (step S1109).

FIG. 12 is a diagram showing an example of the user interface for displaying a list of network devices to which network addresses are assigned by processing in step S1105 described above. In the illustrated example, the assigned network addresses, MAC addresses and device product names of the network devices to which the network addresses have been assigned are displayed. Information for enabling discrimination of devices may include an image representing the appearance of each device, a device name given to each device by a user, or a model number of each device as well the MAC address and the product name. A dialogue box for making detailed settings in one of the network devices is displayed by selecting the network device and clicking a "Set details" button. The program is ended by clicking an "End" button.

Figure 13:
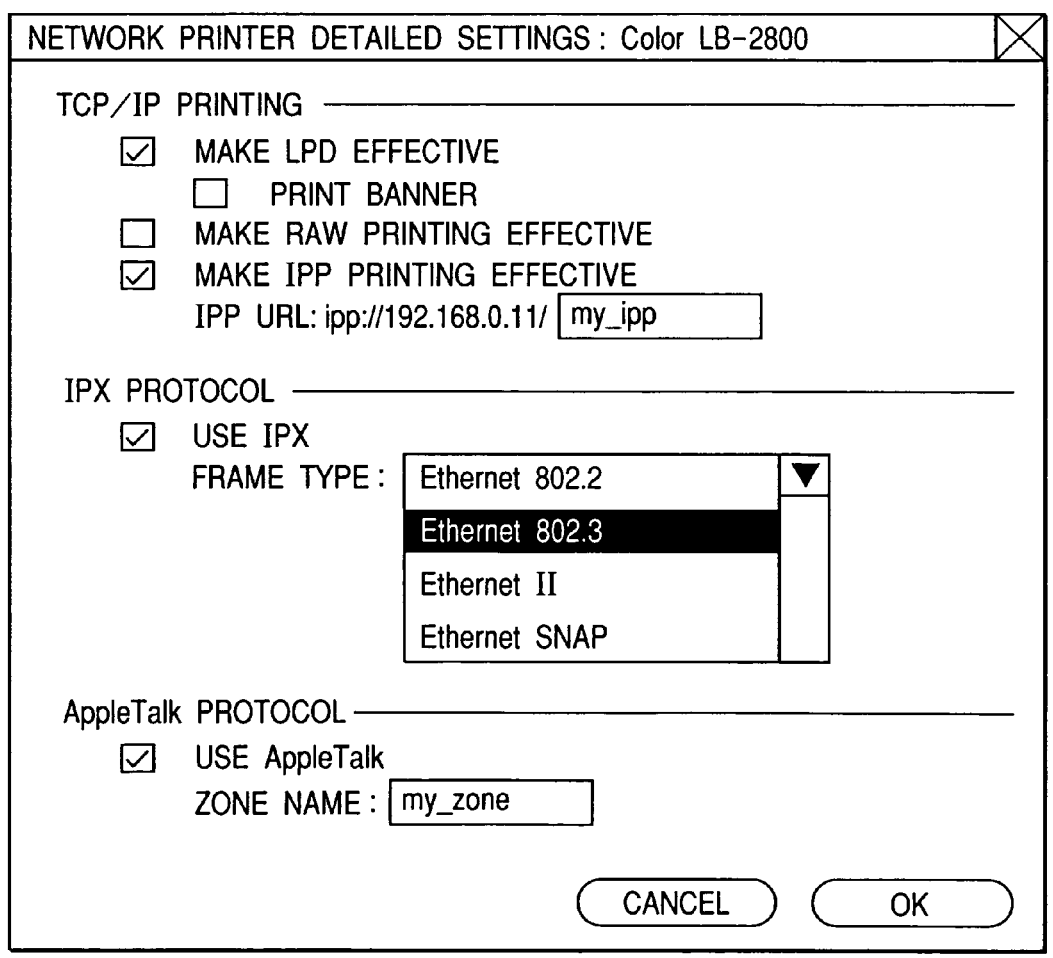
FIG. 13 is a diagram showing an example of a network device detailed setting dialogue.

FIG. 13 is a diagram showing an example of the network device detailed setting dialogue displayed by processing in step S1108 described above.

The user inputs set values through the window and clicks an "OK" button to set the input set values in the network device.

Figure 14:
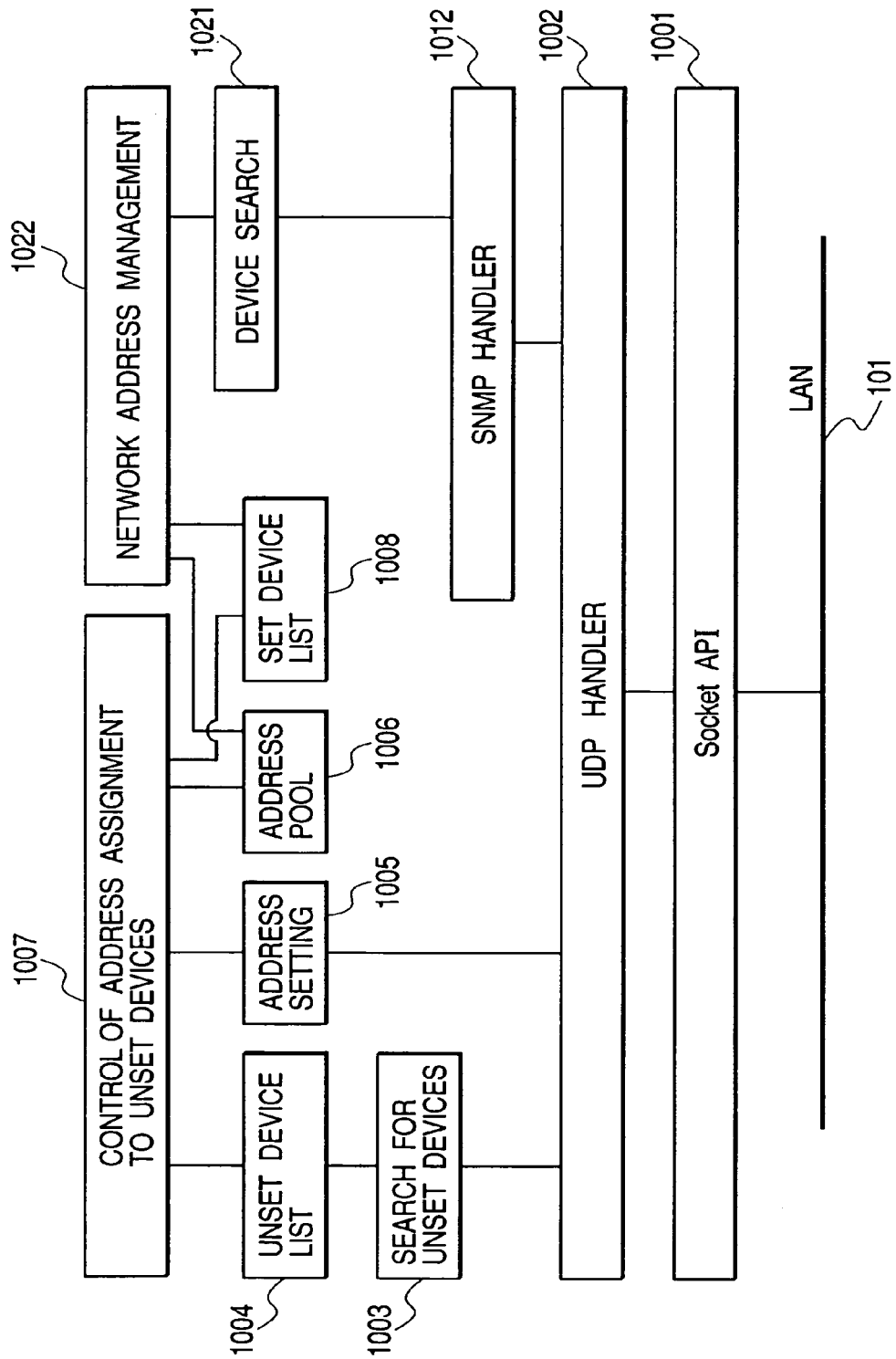
FIG. 14 is a block diagram showing the modular configuration of an automatic network address assignment program executed on an address assignment apparatus according to a second embodiment of the present invention.

FIG. 14 is a block diagram showing the modular configuration of an automatic network address assignment program running on a modified address assignment apparatus. Modules 1001, 1008, and 1012 are the same as the corresponding modules shown in FIG. 10. The automatic network address assignment program shown in FIG. 14 is formed by adding a module 1021 and a module 1022 to the automatic network address assignment program shown in FIG. 10.

Referring to FIG. 14, the module 1021 is a module for searching for network devices having network addresses effective on the LAN 101 with respect to the standard protocol. In the illustrated example, the search function is realized by using SNMP.

The module 1022 is a network address management module.

Figure 15:
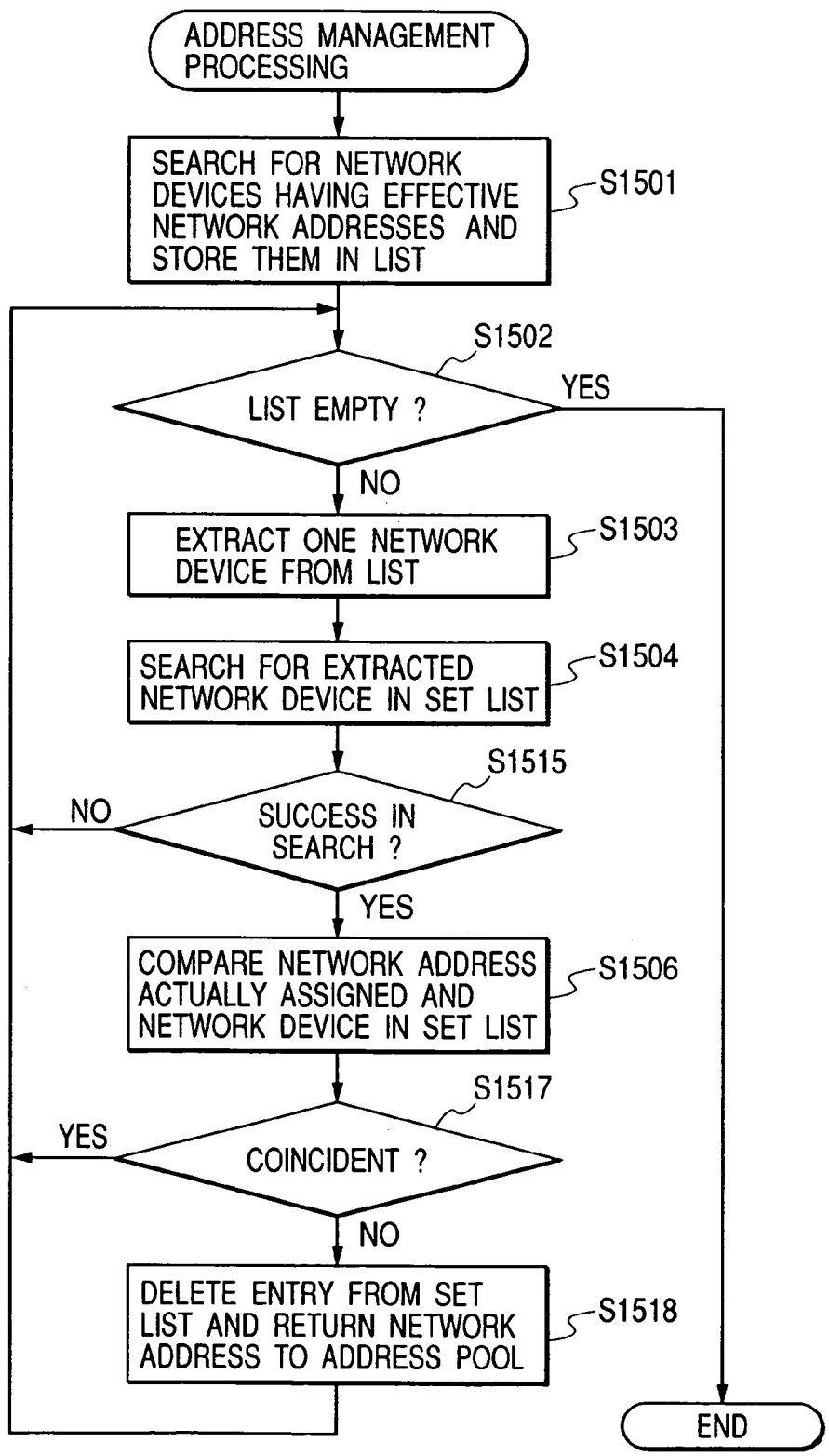
FIG. 15 is a flowchart showing the procedure of network address management processing performed by a network address management module.

FIG. 15 is a flowchart showing the procedure of network address management processing performed by the network address management module.

Referring to FIG. 15, network devices having effective network addresses previously set on a network 101 are first searched for, and the sets of network addresses and network device particular information are stored in a list A with respect to network devices found by searching (step S1501).

If there is no element in the list A, this process ends (step S1502 to END). If there is some element in the list A, one set of a network address and network device particular information is extracted from the list A (step S1503). It is assumed here that the network device having the extracted particular information is "network device D" and the network address is "network address N".

A set list B is then queried to confirm whether the network device D exists in the list (set list B) of network deices to which network addresses have automatically assigned (step S1504). In the set list B, the network addresses of the network devices are stored.

If it is determined by this query that the network device D does not exist in the set list B, the same processing is performed with respect to the next element in the list A (step S1505 to step S1502).

If the network device D exists in the set list B, a network address assigned to the network device D in the set list (assumed to be "network address M") and "network address N" are compared (step S1515 to step S1506).

If the compared addresses are equal to each other, the same processing is performed with respect to the next element in the list A (step S1507 to step S1502).

If the compared addresses are not equal to each other, the information about the network device D is deleted from the set list and "network address M" assigned to "network device D" is returned to the address pool as a network address assignable to an unset device (step S1517 to step S1518). That is, since "network address N" is presently assigned to "network address D", "network address M" is not being used. Therefore "network address M" is enabled to be assigned to some other network device.

The above-described processing is performed with respect to each of the network devices found by searching in step S1501.

According to the present invention, as described above, network address unset network devices are searched for by the automatic network address assignment program to reduce network traffic.

Also, network devices to which network addresses are automatically assigned are stored and displayed to enable a user to recognize the network devices to which network addresses have been automatically assigned and to urge the user to make a further setting for making the network devices operate correctly.

Further, according to the present invention, if a network address is reassigned to a network device to which a network address has been automatically assigned, the network address previously assigned is returned to a pool of network addresses which can be automatically set, thus enabling effective use of network addresses.

Other Embodiments

Needless to say, the present invention can also be attained by supplying a system or an apparatus with a storage medium on which software program codes for realizing the functions of one of the above-described embodiments are recorded, and by making a computer (or a CPU or an MPU) of the system or apparatus read out and execute the program codes stored on the storage medium.

In this case, the program codes themselves read out from the storage medium realize the novel function of the present invention, and the storage medium on which the program codes are stored constitutes the present invention.

For example, a flexible disk, a hard disk, an optical disk, a magneto-optical disk, a compact disc-read only memory (CD-ROM), a compact disc recordable (CD-R), a magnetic tape, a nonvolatile memory card, a read-only memory or the like may be used as the storage medium for supplying the program codes. The program codes may be supplied from a server computer via a communication network.

Also, needless to say, the present invention comprises not only realizing the functions of each of the above-described embodiments by making a computer execute the program codes read out, but also a case in which an OS or the like running on a computer performs part or the whole of actual processing to realize the functions of each of the above-described embodiments.

Further, the present invention comprises a case in which the program codes read out from the storage medium are written to a memory provided on an expansion board inserted in a computer or an expansion unit connected to a computer, and then a CPU or the like provided on the expansion board or the expansion unit performs part or the whole of actual processing to realize the functions of each of the above-described embodiments.

The invention claimed is:

1. A network device display method carried out in an information processing apparatus having a display unit, comprising:
   a first transmission step of broadcasting on a network first data requesting physical addresses of network devices on the network for performing a network device search;
   a first reception step of receiving first reply data from network devices on the network in response to the first data transmitted in said first transmission step, the first reply data including a physical address of the device transmitting the first reply data;
   a second transmission step of broadcasting on the network second data requesting network addresses of network devices on the network for performing a network device search;
   a second reception step of receiving second reply data from network devices on the network in response to the second data transmitted in said second transmission step, wherein the second reply data includes a network address of the device transmitting the second reply data and is received only from network devices having a set network address;
   a list display step of displaying, on the display unit, a list of the network devices from which the first reply data is received in said first reception step, wherein said list display step displays, for each of the network devices, (a) the physical address of the network device as information of the network device, without displaying the network address of the network device, if the second reply data is not received from the network device in said second reception step, and (b) the network address of the network device as information of the network device, without displaying the physical address of the network device, if the second reply data is received from the network device in said second reception step;
   a selecting step of a user selecting one of the network devices from the displayed list on the display unit; and
   a setting step of transmitting data for setting of setting information to the selected one of the network devices selected from the list by the user,
   wherein the list of the network devices displayed on the display unit is provided to allow the user to recognize whether network address setting has been performed in the network devices from which the first reply data is received in said first reception step.

2. The network device display method according to claim 1, wherein each of the network devices does not transmit the second reply data if the destination port number of the second data is a predetermined port number and if the network device is assigned no network address.

3. The network device display method according to claim 1, wherein in said setting step, the data for setting the setting information is transmitted with respect to the physical address included in the first reply data.

4. A non-transitory computer-readable storage medium on which is stored a network device display program carried out in an information processing apparatus having a display unit, the program comprising code that, when executed by a processor, performs the steps of:
   a first transmission step of broadcasting on a network first data requesting physical addresses of network devices on the network for performing a network device search;
   a first reception step of receiving first reply data from network devices on the network in response to the first data transmitted in said first transmission step, the first reply data including a physical address of the device transmitting the first reply data;
   a second transmission step of broadcasting on the network second data requesting network addresses of network devices on the network for a performing network device search;
   a second reception step of receiving second reply data from network devices on the network in response to the second data transmitted in said second transmission step, wherein the second reply data includes a network address of the device transmitting the second reply data and is received only from network devices having a set network address;
   a list display step of displaying, on the display unit, a list of the network devices from which the first reply data is received in said first reception step, wherein said list display step displays, for each of the network devices, (a) the physical address of the network device as information of the network device, without displaying a network address of the network device, if the second reply data is not received from the network device in said second reception step, and (b) the network address of the network device as information of the network device, without displaying the physical address of the network device, if the second reply data is received from the network device in said second reception step;
   a selecting step of a user selecting one of the network devices from the displayed list on the display unit; and
   a setting step of transmitting data for setting of setting information to the selected one of the network devices selected from the list by the user,
   wherein the list of the network devices displayed on the display unit is provided to allow the user to recognize whether network address setting has been performed in the network devices from which the first reply data is received in said first reception step.

5. A network device display apparatus having a display unit, comprising:
   first transmission means for broadcasting on a network first data requesting physical addresses of network devices on the network for performing a network device search;
   first reception means for receiving first reply data from network devices on the network in response to the first data transmitted by said first transmission means, the first reply data including a physical address of the device transmitting the first reply data;
   second transmission means for broadcasting on the network second data requesting network addresses of network devices on the network for performing a network device search;
   second reception means for receiving second reply data from network devices on the network in response to the second data transmitted by said second transmission means, wherein the second reply data includes a network address of the device transmitting the second reply data and is received only from network devices having a set network address;
   list display means for displaying, on the display unit, a list of the network devices from which the first reply data is received by the first receptions means, wherein said list display means displays, for each of the network devices, (a) the physical address of the network device as information of the network device, without displaying a network address of the network device, if the second reply data is not received from the network device by said second reception means, and (b) the network address of the network device as information of the network device, without displaying the physical address of the network device, if the second reply data is received from the network device by said second reception means;

selecting means for a user to select one of the network devices from the displayed list on the display unit; and setting means for transmitting data for setting of setting information to the selected one of the network devices selected from the list by the user, wherein the list of the network devices displayed on the display unit is provided to allow the user to recognize whether network address setting has been performed in the network devices from which the first reply data is received by said first reception means.

6. The network device display method according to claim 1, further comprising a display step of displaying, on the display unit, the setting information set to the selected network device and the physical address of the selected network device, after the data for setting the setting information is transmitted in said setting step.

7. The non-transitory computer-readable storage medium according to claim 4, further comprising a display step of displaying, on the display unit, the setting information set to the selected network device and the physical address of the selected network device, after the data for setting the setting information is transmitted in said setting step.

8. The network device display apparatus according to claim 5, further comprising a display means for displaying, on the display unit, the setting information set to the selected network device and the physical address of the selected network device, after the data for setting the setting information is transmitted by said setting means.

* * * * *